United States Patent
Takahashi

(10) Patent No.: US 11,626,131 B2
(45) Date of Patent: Apr. 11, 2023

(54) MAGNETIC HEAD AND METHOD FOR MANUFACTURING THE SAME, AND MAGNETIC RECORDING AND READING DEVICE AND METHOD FOR MANUFACTURING THE SAME

(71) Applicants: Kabushiki Kaisha Toshiba, Tokyo (JP); Toshiba Electronic Devices & Storage Corporation, Tokyo (JP)

(72) Inventor: Kan Takahashi, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/583,688

(22) Filed: Jan. 25, 2022

(65) Prior Publication Data
US 2023/0056151 A1  Feb. 23, 2023
US 2023/0056151 A1  Feb. 23, 2023

(30) Foreign Application Priority Data
Aug. 23, 2021 (JP) .............................. JP2021-135449

(51) Int. Cl.
*G11B 5/40* (2006.01)
*G11B 5/11* (2006.01)
*G11B 5/187* (2006.01)
*G11B 5/31* (2006.01)

(52) U.S. Cl.
CPC .................. *G11B 5/40* (2013.01); *G11B 5/11* (2013.01); *G11B 5/187* (2013.01); *G11B 5/3103* (2013.01)

(58) Field of Classification Search
None
See application file for complete search history.

(56) References Cited

U.S. PATENT DOCUMENTS

| | | | |
|---|---|---|---|
| 5,075,809 A * | 12/1991 | Heinz | G11B 5/11 360/110 |
| 5,104,685 A * | 4/1992 | Takahashi | G11B 5/727 427/595 |
| 5,196,974 A * | 3/1993 | Higashiya | G11B 5/60 360/236.8 |
| 5,936,801 A * | 8/1999 | Boutaghou | G11B 5/105 |
| 6,038,101 A | 3/2000 | Yoda et al. | |

(Continued)

FOREIGN PATENT DOCUMENTS

| JP | 2004-14073 A | 1/2004 |
|---|---|---|
| JP | 2008-181580 A | 8/2008 |

*Primary Examiner* — Peter Vincent Agustin
(74) *Attorney, Agent, or Firm* — Knobbe, Martens, Olson & Bear, LLP

(57) ABSTRACT

According to one embodiment, a magnetic head includes a protective layer. When an element unit is a magnetic recording element unit, the protective layer includes a first region on a magnetic recording element protrusion and a second region on a magnetic recording element shield, the first region and the second region being flush with each other, or the first region being recessed more than the second region. When the element unit is a magnetic reading element unit, the protective layer includes a third region on a magnetic reading element protrusion and a fourth region on a magnetic reading element shield, the third region and the fourth region being flush with each other, or the third region being recessed more than the fourth region.

7 Claims, 10 Drawing Sheets

(56) References Cited

U.S. PATENT DOCUMENTS

| | | | |
|---|---|---|---|
| 6,317,293 B1* | 11/2001 | Katayama | G11B 21/20 |
| 6,891,699 B2 | 5/2005 | Kameyama et al. | |
| 9,892,746 B1* | 2/2018 | Zheng | H01L 21/31 |
| 2002/0089794 A1* | 7/2002 | Chang | G11B 5/3163 |
| | | | 29/603.03 |
| 2003/0123190 A1* | 7/2003 | Sato | G11B 5/48 |
| | | | 360/234.5 |
| 2003/0227716 A1 | 12/2003 | Yamakura et al. | |
| 2004/0212929 A1* | 10/2004 | Otsuka | G11B 5/6005 |
| 2006/0098339 A1* | 5/2006 | Koyama | G11B 5/3116 |
| 2009/0059416 A1* | 3/2009 | Okada | G11B 5/8408 |
| | | | 360/75 |
| 2010/0246066 A1* | 9/2010 | Kasamatsu | G11B 5/187 |
| | | | 427/595 |
| 2010/0309581 A1 | 12/2010 | Wu et al. | |
| 2012/0218663 A1 | 8/2012 | Sasaki et al. | |
| 2014/0218820 A1* | 8/2014 | Nagata | G11B 5/012 |
| | | | 360/75 |
| 2018/0082710 A1* | 3/2018 | Tada | G11B 5/842 |
| 2019/0027168 A1* | 1/2019 | Kasada | G11B 5/712 |
| 2019/0027179 A1* | 1/2019 | Ozawa | G11B 5/70678 |

* cited by examiner

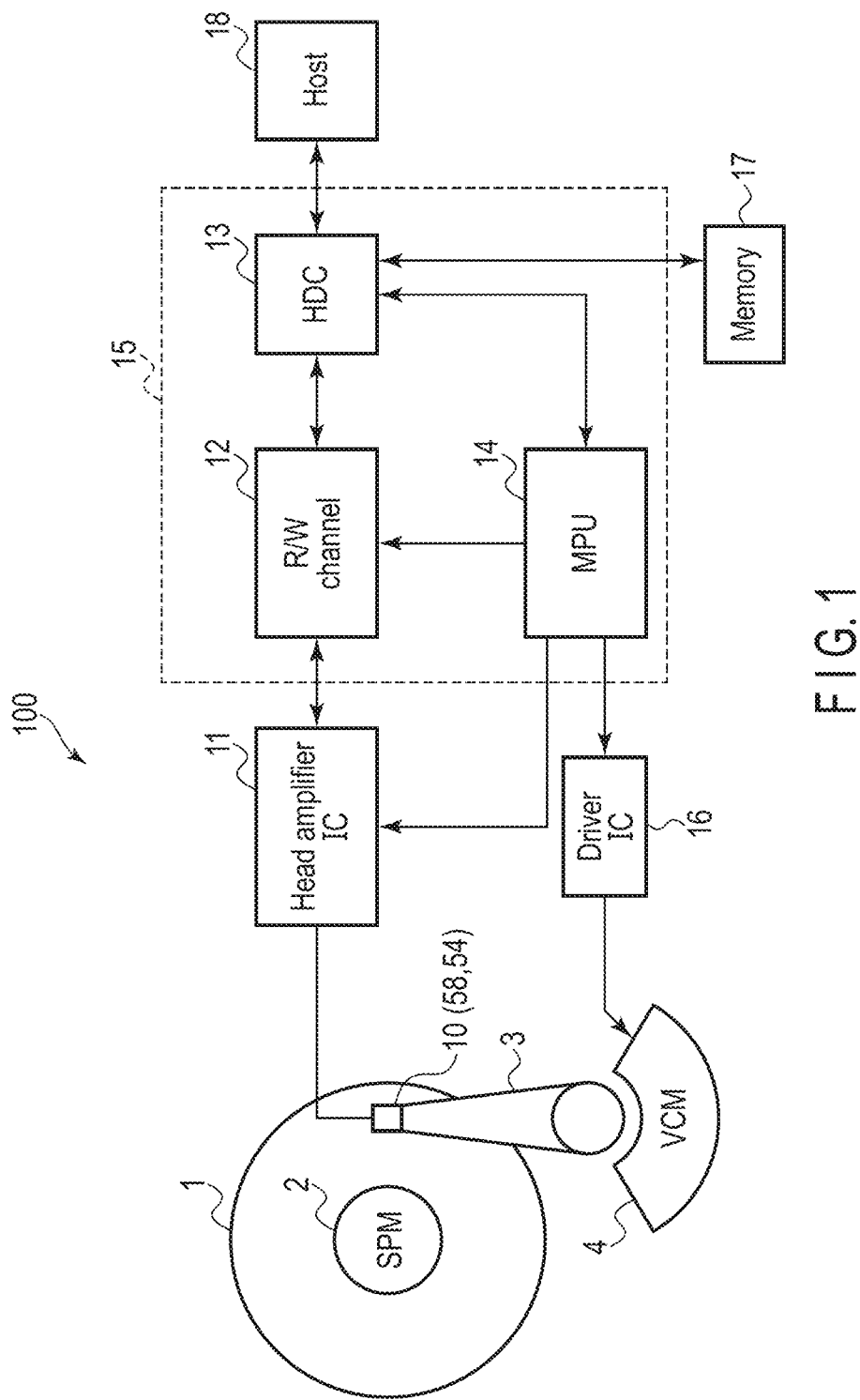
F I G. 1

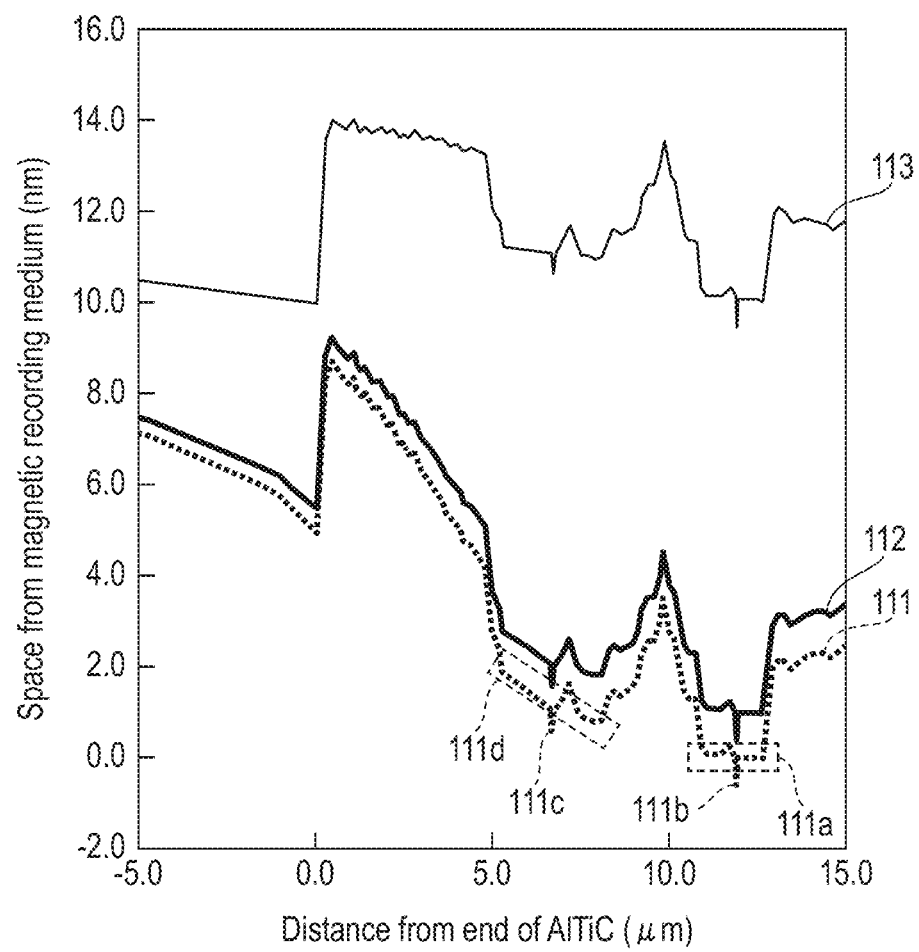
F I G. 6

MAGNETIC HEAD AND METHOD FOR MANUFACTURING THE SAME, AND MAGNETIC RECORDING AND READING DEVICE AND METHOD FOR MANUFACTURING THE SAME

CROSS-REFERENCE TO RELATED APPLICATIONS

This application is based upon and claims the benefit of priority from Japanese Patent Application No. 2021-135449, filed Aug. 23, 2021, the entire contents of which are incorporated herein by reference.

FIELD

Embodiments described herein relate generally to a magnetic head and a method for manufacturing the same, and a magnetic recording and reading device and a method for manufacturing the same.

BACKGROUND

A magnetic recording and reading element of a magnetic head of a magnetic disk device (HDD) protrudes in a direction in which the magnetic recording and reading element approaches a magnetic disk, relative to a shield around the magnetic recording and reading element, due to its material and structural characteristics, and a protruding amount thereof is less than about 1 nm.

Since a low flying height of the magnetic head of the HDD increases a recording density, the flying height of the magnetic head is kept constant by bringing a magnetic recording and reading element unit into contact with the magnetic disk once (touch-down) based on thermal expansion using a dynamic flying height (DFH) technology or the like, which causes the magnetic recording and reading element unit to protrude toward the medium, and then bringing the magnetic recording and reading element unit back to form a desired gap (back-off). However, the magnetic recording and reading element unit may be damaged when brought into contact with the magnetic disk in the touch-down operation. In addition, since the gap between the magnetic head and the magnetic disk is narrower in an area corresponding to the protruding magnetic recording and reading element unit, for example, when an unexpected change or the like occurs in the magnetic head, the protruding magnetic recording and reading element unit may come into contact with the magnetic disk, which causes damage and deterioration in recording and reading performance. In a case where the magnetic disk has a low recording density, some damage caused by the contact between the magnetic recording and reading element protrusion and the magnetic disk does not significantly affect the overall performance and reliability of the device. In recent years, however, in accordance with an increase in recording density, the magnetic recording and reading element is downsized. As a result, the contact damage may greatly affect the overall performance and reliability of the device.

Therefore, it has been desired for reducing the damage to the magnetic head and securing the operation reliability of the magnetic head and the magnetic recording and reading device on which the magnetic head is mounted.

BRIEF DESCRIPTION OF THE DRAWINGS

FIG. 1 is a schematic diagram illustrating a magnetic recording and reading device according to a second embodiment.

FIG. 6 illustrates graphs each indicating a state in which a magnetic recording element and a magnetic reading element protrude on the air bearing surface.

DETAILED DESCRIPTION

Figure 2:
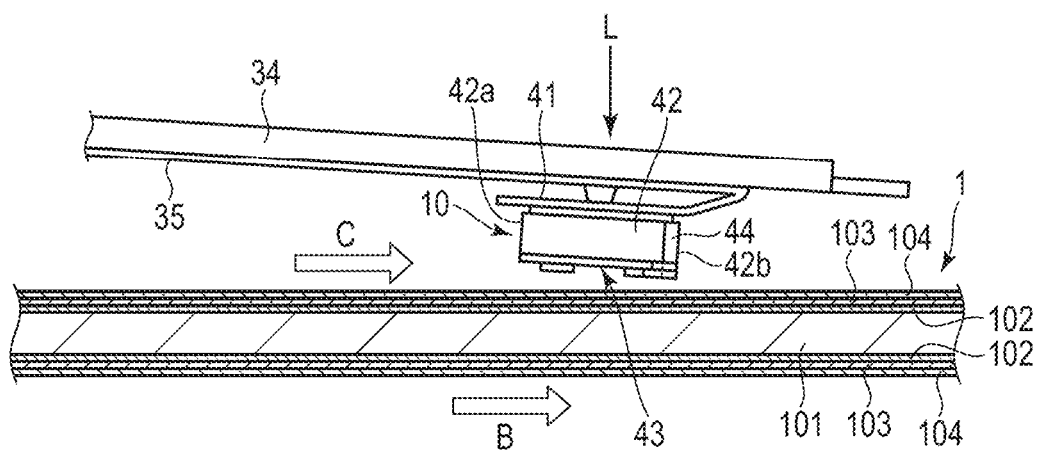
FIG. 2 is a side view illustrating a magnetic head and a suspension.

In general, according to one embodiment, a magnetic head to be flown above a magnetic recording medium to record or read magnetic information includes:

at least one element unit of a magnetic recording element unit or a magnetic reading element unit on an air bearing surface side facing the magnetic recording medium when the magnetic head is flown; and a protective layer that protects the element unit, wherein the magnetic recording element unit includes a magnetic recording element, a magnetic recording element protrusion protruding from the magnetic recording element, and a magnetic recording element shield surrounding the magnetic recording element protrusion, the magnetic reading element unit includes a magnetic reading element, a magnetic reading element protrusion protruding from the magnetic reading element, and a magnetic reading element shield surrounding the magnetic reading element protrusion, the protective layer includes a first region on the magnetic recording element protrusion and a second region on the magnetic recording element shield when the element unit is the magnetic recording element unit, or includes a third region on the magnetic reading element protrusion and a fourth region on the magnetic reading element shield when the element unit is the magnetic reading element unit, the first region and the second region are flush with each other, or the first region is recessed more than the second region, and the third region and the fourth region are flush with each other, or the third region is recessed more than the fourth region.

A magnetic head according to a first embodiment is a magnetic head be flown above a magnetic recording medium to record or read magnetic information, and includes an element unit including a magnetic recording element unit and/or a magnetic reading element unit on an air bearing surface side facing the magnetic recording medium when the magnetic head is flown; and a protective layer that protects the element unit.

The magnetic recording element unit includes a magnetic recording element, a magnetic recording element protrusion protruding from the magnetic recording element, and a magnetic recording element shield surrounding the magnetic recording element protrusion. The magnetic reading element unit includes a magnetic reading element, a magnetic reading element protrusion protruding from the magnetic reading element, and a magnetic reading element shield surrounding the magnetic reading element protrusion.

The protective layer includes a first region on the magnetic recording element protrusion and a second region on the magnetic recording element shield when the element unit is the magnetic recording element unit, or includes a third region on the magnetic reading element protrusion and a fourth region on the magnetic reading element shield when the element unit is the magnetic reading element unit.

In addition, in the protective layer, when the element unit is the magnetic recording element unit, (1) the first region and the second region are flush with each other, or the first region is recessed more than the second region, and when the element unit is the magnetic reading element unit, (2) the third region and the fourth region are flush with each other, or the third region is recessed more than the fourth region.

When the element unit includes both the magnetic recording element unit and the magnetic reading element unit, the protective layer can have at least one of the shapes (1) and (2).

A magnetic recording and reading device according to a second embodiment is a magnetic recording and reading device including the magnetic head according to the first embodiment.

If the magnetic head according to the embodiment is used, damage to the magnetic head caused when brought into contact with the magnetic recording medium can be reduced by adjusting the thickness of the protective layer of the magnetic head. If an influence of the damage caused by the contact between the magnetic recording and reading element protrusion and the magnetic recording medium in the touchdown process or during the overall operation on the performance and reliability of the device, the performance and reliability of the device can be secured.

Hereinafter, embodiments will be described in more detail with reference to the drawings.

First Embodiment

First, configurations of a magnetic head according to a first embodiment and a disk drive as a magnetic recording and reading device according to a second embodiment including the magnetic head will be described with reference to FIG. 1. Here, the magnetic recording and reading device is illustrated as including a magnetic head using, as an element unit, a magnetic recording and reading element unit having a configuration as both a magnetic recording element unit and a magnetic reading element unit. The configuration of the disk drive as the magnetic recording and reading device illustrated in FIG. 1 is also applied to each of second to sixth embodiments, which will be described later.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

FIG. 1 is a schematic diagram illustrating a magnetic recording and reading device according to the second embodiment.

As illustrated in FIG. 1, a magnetic disk drive 100 is a perpendicular magnetic recording type magnetic disk device as a magnetic recording medium including, for example, a magnetic disk for perpendicular magnetic recording (hereinafter simply referred to as disk) 1 and a magnetic head 10 having a magnetic flux control layer to be described later.

The disk 1 is fixed to a spindle motor (SPM) 2 for rotational movement. The magnetic head 10 is mounted on an actuator 3, and is configured to move in a radial direction above the disk 1. The actuator 3 is driven to be rotated by a voice coil motor (VCM) 4. The magnetic head 10 includes a recording (write) head (magnetic recording element unit) 58 and a reading (read) head (magnetic reading element unit) 54.

Further, the disk drive includes a head amplifier integrated circuit (hereinafter, referred to as head amplifier IC) 11, a read/write channel (R/W channel) 12, a hard disk controller (HDC) 13, a microprocessor unit (MPU) 14, a driver IC 16, and a memory 17. The R/W channel 12, the HDC 13, and the MPU 14 are incorporated in a controller 15 formed of a one-chip integrated circuit.

As will be described later, the head amplifier IC 11 includes a group of circuits for driving a spin-torque oscillator (STO) which is a magnetic flux control layer. Hereinafter, the spin-torque oscillator will be referred to as STO. Further, the head amplifier IC 11 includes a driver supplying a recording signal (write current) corresponding to write data supplied from the R/W channel 12 to the recording head 58. In addition, the head amplifier IC 11 includes a read amplifier amplifying a read signal output from the reading head 54 and transmitting the amplified read signal to the R/W channel 12.

The R/W channel 12 is a circuit that processes a signal corresponding to read/write data. The HDC 13 constitutes an interface between the disk drive and a host 18, and executes a control for transferring read/write data.

The MPU 14 is a main control unit of the disk drive, and executes a control of a read/write operation and a servo control necessary for positioning the magnetic head 10. Further, the MPU 14 executes an energization control of the STO according to the present embodiment. The memory 17 includes a buffer memory including a DRAM, a flash memory, and the like.

FIG. 2 is a side view illustrating a magnetic head and a suspension.

As illustrated in FIG. 2, each magnetic head 10 is configured as a flying head, and includes a slider 42 having a substantially rectangular parallelepiped shape and a head unit 44 for recording and reading provided at an outflow end (trailing end) of the slider 42. The magnetic head 10 is fixed to a gimbal spring 41 provided at a tip portion of a suspension 34. A head load L is applied to each magnetic head 10 toward a surface of the magnetic disk 1 due to the elasticity of the suspension 34. As illustrated in FIG. 2, each magnetic head 10 is connected to the head amplifier IC 11 and the HDC 13 via a wiring member (flexure) 35 fixed on the suspension 34 and an arm 32.

Next, configurations of the magnetic disk 1 and the magnetic head 10 will be described in detail.

Figure 3:
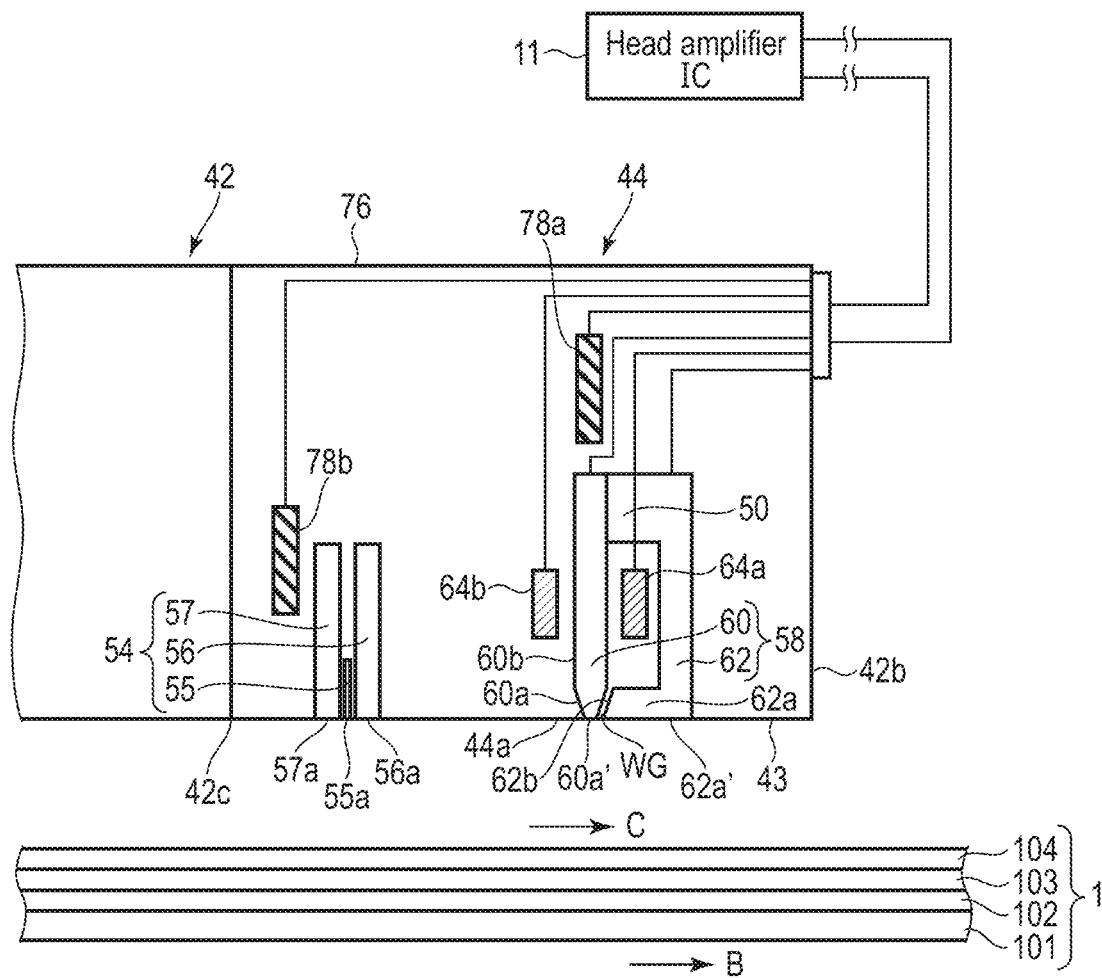
FIG. 3 is an enlarged cross-sectional view illustrating a head unit of the magnetic head and a magnetic disk.

FIG. 3 is an enlarged cross-sectional view illustrating the head unit 44 of the magnetic head 10 and the magnetic disk 1.

As illustrated in FIGS. 2 and 3, the magnetic disk 1 includes a substrate 101 formed in a disk shape having, for example, a diameter of about 3.5 inches (about 9 cm) and a thickness of about 0.8 mm and made of a non-magnetic material. A soft magnetic layer 102, a magnetic recording layer 103, and a protective layer 104 are sequentially laminated on each surface of the substrate 101, the soft magnetic layer 102 being formed as an underlayer to have a thickness of about 20 to 30 nm and made of a material exhibiting soft magnetic characteristics, the magnetic recording layer 103 being formed thereon to have a thickness of about 10 to 20 nm and having magnetic anisotropy in a direction perpendicular to a disk surface, and the protective layer 104 being formed thereon to have a thickness of about 1 to 2 nm.

The slider 42 as a main body of the magnetic head 10 is formed as, for example, a sintered body (AlTiC) of alumina and titanium carbide, and the head unit 44 is formed by laminating thin films. The slider 42 has a rectangular disk-facing surface (air bearing surface (ABS)) 43 facing the surface of the magnetic disk 1. The slider 42 is flown by an air flow C generated between the disk surface and the ABS 43 when the magnetic disk 1 rotates. A direction of the air flow C coincides with a rotation direction B of the magnetic disk 1. The slider 42 is disposed with respect to the surface of the magnetic disk 1 such that a direction in which the ABS 43 is long substantially coincides with the direction of the air flow C.

The slider 42 has a leading end 42a located on an inflow side of the air flow C and a trailing end 42b located on an outflow side of the air flow C. Although not illustrated, a leading step, a trailing step, a side step, a negative pressure cavity, and the like are formed on the ABS 43 of the slider 42.

As illustrated in FIG. 3, the head unit 44 is provided at the trailing end 42b of the slider 42, includes a reading head 54 and a recording head (magnetic recording head) 58 formed by a thin film process, and is formed as a separation type magnetic head. The reading head 54 and the recording head 58 are covered with, for example, a protective insulating film 76 made of a base material such as alumina, except for portions exposed to the ABS 43 of the slider 42. The protective insulating film 76 constitutes an external shape of the head unit 44.

The reading head 54 includes a magnetic film 55 exhibiting a magnetoresistance effect, and shield films (magnetic reading element shields) 56 and 57 disposed on a trailing side and a leading side of the magnetic film 55, respectively, with the magnetic film 55 sandwiched therebetween. A tip portion 55a of the magnetic film 55, a tip portion 56a of the shield film 56, and a tip portion 57a of the shield film 57 are exposed to the ABS 43 of the slider 42. The tip portion 55a of the magnetic reading element protrudes toward the magnetic disk beyond the tip portions 56a and 57a of the shield films, and a protruding amount thereof is about 1 nm or less.

The recording head 58 is provided at the trailing end 42b of the slider 42 with respect to the reading head 54.

Figure 4:
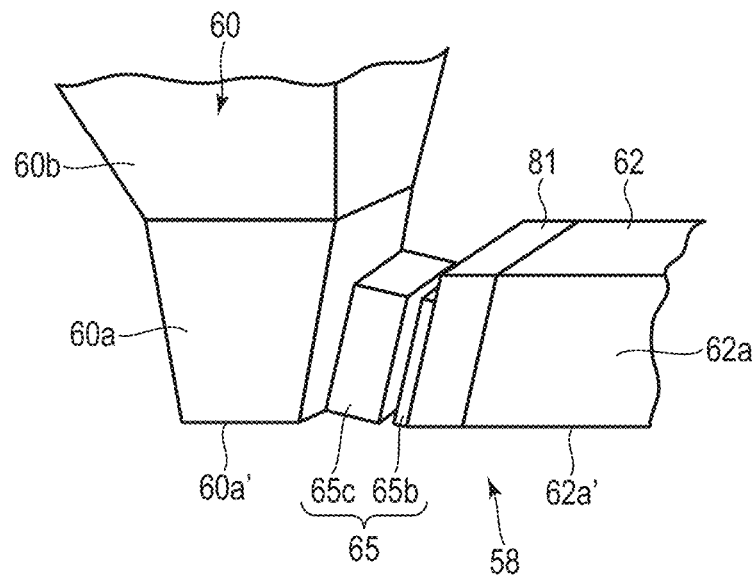
FIG. 4 is a perspective view schematically illustrating a periphery of a write gap of a recording head.
Figure 5:
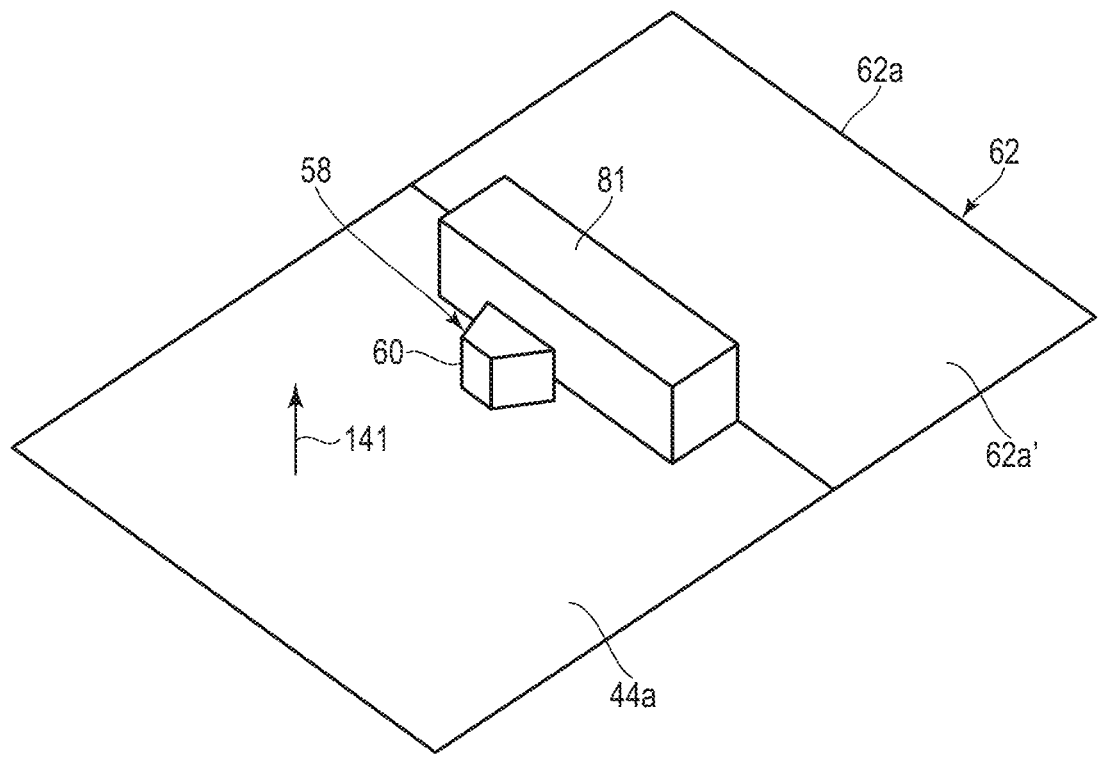
FIG. 5 is an enlarged schematic view illustrating a part of the recording head of FIG. 4 when viewed from an air bearing surface.

FIG. 4 is a perspective view schematically illustrating a periphery of a write gap WG of the recording head 58, and FIG. 5 is an enlarged schematic view illustrating a part of the recording head 58 of FIG. 4 when viewed from an air bearing surface side.

As illustrated in FIGS. 3 to 5, the recording head 58 includes: a main magnetic pole 60 made of a highly saturated magnetization material generating a recording magnetic field in a direction perpendicular to the surface of the magnetic disk 1; a trailing shield (auxiliary magnetic pole) 62 disposed on a trailing side of the main magnetic pole 60 and made of a soft magnetic material to efficiently close a magnetic path via the soft magnetic layer 102 directly below the main magnetic pole 60; recording coils 64a and 64b disposed to be wound around a magnetic core (magnetic circuit) including the main magnetic pole 60 and the trailing shield 62, so that a magnetic flux flows through the main magnetic pole 60 when writing a signal to the magnetic disk 1; and a magnetic flux control layer 65 disposed to be flush with the ABS 43 in the write gap between an end portion 60a of the main magnetic pole 60 on the ABS 43 side and the trailing shield 62.

The main magnetic pole 60 formed of a soft magnetic material extends substantially perpendicular to the surface of the magnetic disk 1 and the ABS 43. A lower end portion of the main magnetic pole 60 on the ABS 43 side includes a narrowing portion 60b tapered toward the ABS 43 and narrowed in a funnel shape in a track width direction, and an end portion 60a having a predetermined width extending from the narrowing portion 60b toward the magnetic disk. A tip, that is, a lower end, of the end portion 60a is exposed to the ABS 43 of the magnetic head. The width of the end portion 60a in the track width direction substantially corresponds to a width of a track in the magnetic disk 1.

The trailing shield 62 made of a soft magnetic material is formed in a substantially L shape. The trailing shield 62 includes an end portion 62a facing the end portion 60a of the main magnetic pole 60 with the write gap WG interposed therebetween, and a connection portion (back gap portion) 50 separated from the ABS 43 and connected to the main magnetic pole 60. The connecting portion 50 is connected to an upper portion, that is, an upper portion away backward or upward of the ABS 43, of the main magnetic pole 60 via a non-conductor, although not illustrated.

The end portion 62a of the trailing shield 62 is formed in an elongate rectangular shape. A lower end 62a' of the trailing shield end portion 62a is exposed to the ABS 43 of the slider 42. A leading-side end surface (an end surface on the main magnetic pole side) 62b of the end portion 62a extends along the track width direction of the magnetic disk 1, and is inclined toward a trailing side with respect to the ABS 43. The leading-side end surface 62b faces a shield-side end surface 60c of the main magnetic pole 60 in a lower end portion (the end portion 60a and a part of the narrowing portion 60b) of the main magnetic pole 60, substantially in parallel, with the write gap WG interposed therebetween. A tip portion 60a' of the main magnetic pole 60 protrudes toward the magnetic disk 1 beyond the lower end (magnetic recording element shield) 62a' of the trailing shield end portion 62a and a lower end (magnetic recording element shield) 44a of the head unit 44, and a protruding amount thereof is about 1 nm or less.

As illustrated in FIG. 4, a microwave assisted magnetic recording (MAMR) element is shown as an example of the recording head 58, and a spin torque oscillator (STO) element 65 specific to the MAMR element is disposed at the position of the above-described write gap. The STO element 65 includes, for example, a spin injection layer 65c on the main magnetic pole 60 side and an oscillation layer 65b on the write shield side. Although not illustrated, an intermediate layer or the like can be provided between the spin injection layer 65c and the oscillation layer 65b. In addition, a hot seed layer (HotSL) 81 is provided in a portion of the write shield 62 near the main magnetic pole 60, and protrudes toward the magnetic disk 1 with respect to the write shield 62, similarly to the main magnetic pole 60. A protruding amount thereof is about 1 nm or less. In addition, as illustrated in FIG. 5, the main magnetic pole 60 and the HotSL 81 protrude from the end portion 62a of the write shield 62 in a direction in which the main magnetic pole 60 and the HotSL 81 approach the magnetic disk, which is not illustrated, for example, a direction indicated by an arrow 141.

FIG. 6 illustrates graphs each indicating a state in which the magnetic recording element and the magnetic reading element protrude on the air bearing surface.

Note that, here, a shape of the air bearing surface of the head unit of the magnetic head having a protective layer, which is formed in accordance with the protruding shape of the magnetic recording element 60(81) and the magnetic reading element 55, is measured. Each of the graphs 111, 112, and 113 indicates a relationship between a distance from an air bearing surface-side end 42c of the AlTiC member constituting the slider 42 and a space between the surface of the magnetic recording medium 1 and the air bearing surface 43, while the graph 111 represents a touch-down process, the graph 112 represents a back-off process, and the graph 113 represents a case where thermal expansion of the magnetic recording element 60(81) and the magnetic reading element 55 (magnetic recording and reading elements) using the DFH technology is turned off.

A region where the distance from the air bearing surface-side end 42c is less than 0 represents a cross-sectional shape of an air bearing surface of the AlTiC member, a region where the distance from the air bearing surface-side end 42c is more than 0 represents a cross-sectional shape of an air bearing surface of the head unit 44, and a point where the distance from the air bearing surface-side end 42c is 0 is a boundary between the AlTiC member and a member constituting the head unit 44, for example, alumina.

In FIG. 6, a protruding portion 1/1c represents a protrusion of the magnetic reading element 55, and a region 111d represents magnetic reading element shields 56a and 57a around the magnetic reading element 55. As illustrated, it can be seen that the protruding portion 1/1c protrudes by about 1 nm or less from the region 111d representing the magnetic reading element shields 56a and 57a. In addition, a protruding portion 1/1b represents a protrusion of the magnetic recording element 60(81), and a region 111a represents a magnetic recording element shield 44a around the magnetic recording element 60(81). As illustrated, it can be seen that the protruding portion 111b protrudes by about 1 nm or less from the region 111a representing the magnetic recording element shield 44a.

As described above, the magnetic recording and reading element units 58 and 54 (magnetic reading element: reader and magnetic recording element: writer) mounted on the magnetic head 10 of the magnetic disk device 100 (HDD) protrude with respect to the surrounding shields in a direction in which the magnetic recording and reading element units 58 and 54 approach the magnetic disk 1 as illustrated in FIG. 6, and a protruding amount thereof is about 1 nm or less.

Normally, when manufacturing an HDD 100 having such a magnetic head 10 mounted thereon, in an inspecting process after an assembling process for the HDD 100, an adjustment (a touch-down and back-off adjustment) for suppressing a variation between the heads in gap is performed by heating an area including the protrusions of the magnetic recording and reading element units 58 and 54 for thermal expansion, such that the protrusions protrude to be brought into contact with the magnetic disk 1 once (touch-down (TD)), and bringing the protrusions back to form a desired gap (back-off (BO)).

By keeping constant such a distance between the magnetic disk 1 and the magnetic recording and reading element units 58 and 54 protruding toward the magnetic disk 1 beyond the shields through the above-described touch-down and back-off adjustment, there are advantages in that a variation in recording and reading ability between the heads is reduced and an assembly yield of the hard disk device 100 is improved, but the magnetic recording and reading element units 58 and 54 may be damaged because the protrusions of the magnetic recording and reading element units 58 and 54 are scraped when contacting the magnetic disk 1 in the touch-down process. This is because the contact between the magnetic heads and the disk in the touch-down process (spacing=0 nm) as illustrated in the graph 111 for the touch-down process of FIG. 6 can be detected when the shields disposed around the protrusions of the magnetic recording and reading element units 58 and 54 approach the disk to a distance of substantially zero, and it is difficult to detect that the protrusions of the magnetic recording and reading element units 58 and 54 contact the magnetic disk 1.

In addition, after performing the touch-down and back-off adjustment in this manner, the protrusions of the magnetic recording and reading element units 58 and 54 are very close to the magnetic disk, and accordingly, may be scraped when brought into contact with the magnetic disk 1 if an accidental variation in gap occurs during the operation of the HDD, for example, due to a disturbance such as an impact or vibration, resulting in damage to the magnetic recording and reading element units 58 and 54.

For this reason, in the magnetic head according to the embodiment, by adjusting a thickness of the protective layer of the magnetic head of the magnetic disk device, it is possible to reduce an influence of damage caused by the contact between the magnetic recording and reading element protrusions and the magnetic recording medium in the touch-down process or during the overall operation on the performance and reliability of the device, such that the performance and reliability of the device can be secured.

Figure 7:
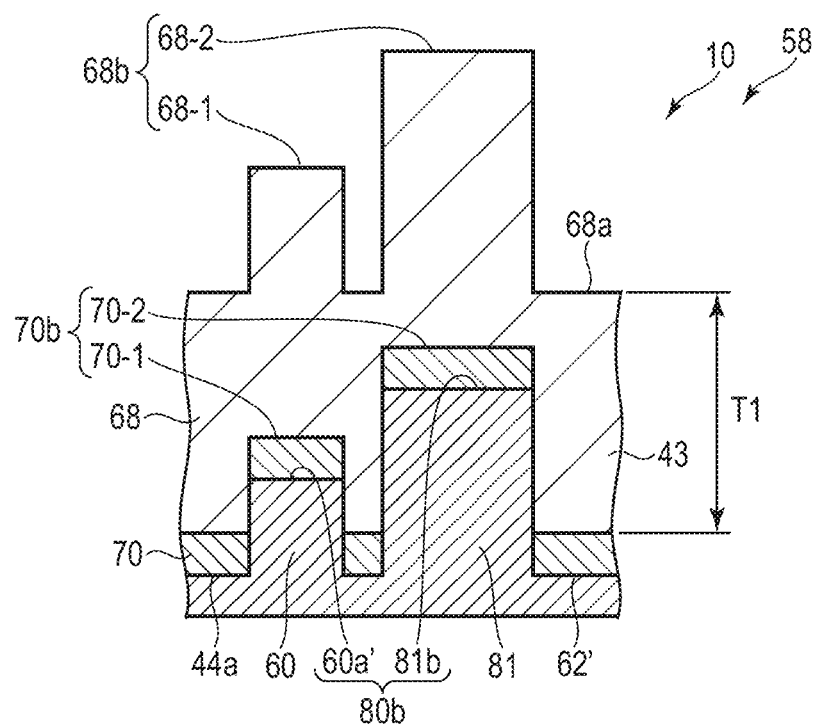
FIG. 7 is a view schematically illustrating a periphery of a magnetic recording element unit of the magnetic head before processed.

FIG. 7 is a view schematically illustrating a periphery of the magnetic recording element unit of the magnetic head before processed.

As illustrated, in the magnetic recording element unit 58 of the magnetic head 10 before processed, a protrusion 60a' of the main magnetic pole 60 and a protrusion 81b of the HotSL 81 form a magnetic recording element protrusion 80b protruding toward the medium beyond the surrounding magnetic recording element shield 44a. A protective layer 68 such as carbon is provided on the magnetic recording element protrusion 80b and the magnetic recording element shield 44a, which is provided around the magnetic recording element protrusion 80b, via an adhesion layer 70 such as silicon. A thickness of the adhesion layer 70 can be about 0.3 to 1.0 nm. A thickness T1 of the protective layer 68 can be about 1.0 to 2.0 nm. The adhesion layer 70 is used to cause the protective layer 68 and the magnetic recording element unit 58 to adhere to each other. In addition, by covering the magnetic recording element unit 58 with two layers including the adhesion layer 70 and the protective layer 68, the magnetic recording element unit 58 is protected from corrosion and contact damage. The protective layer 68 includes a first region 68b on the magnetic recording element protrusion 80b and a second region 68a on the magnetic recording element shield 44a. A protrusion 68-1 formed in accordance with a contour shape of the protrusion 60a' of the main magnetic pole 60 and a protrusion 68-2 formed in accordance with a contour shape of the protrusion 81b of the HotSL 81 are provided in the first region 68b, and the first region 68b protrudes beyond the second region 68a in the protective layer 68 before processed. The thicker the protective layer 68, the more reliably the magnetic recording and reading element units 58 and 54 can be protected. On the other hand, if the film thickness of the protective layer 68 is too thick, the gap between the magnetic recording and reading element units 58 and 54 and the magnetic disk 1 widens. This tends to cause deterioration in recording and reading ability, resulting in deterioration in recording density. In addition, when the protruding first region 68b is brought into contact with the magnetic recording medium 1 in the touch-down process, the magnetic recording element unit 58 tends to be damaged.

Therefore, in the magnetic head according to the embodiment, the protective layer 68 is processed so that the first region 68b and the second region 68a are flush with each other, or the first region 68b is recessed more than the second region 68a.

Figure 8:
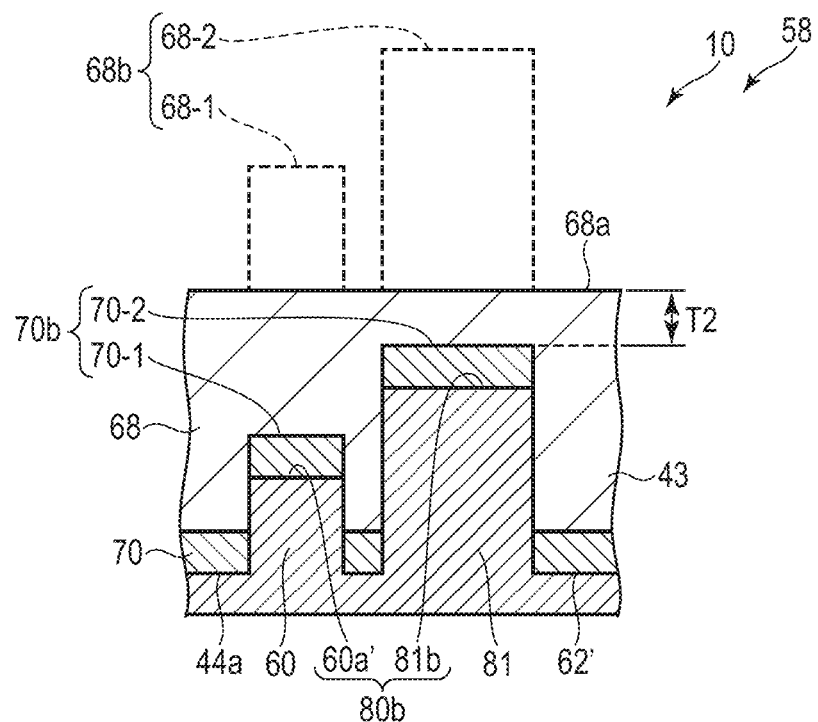
FIG. 8 is a view schematically illustrating a periphery of a magnetic recording element unit of the magnetic head after processed.

FIG. 8 is a view schematically illustrating a periphery of the magnetic recording element unit of the magnetic head after processed according to the embodiment.

A configuration of the magnetic head illustrated in FIG. 8 is similar to that in FIG. 7, except that the protective layer 68 is processed such that the first region 68b and the second region 68a can be formed to be flush with each other by removing the protrusions 68-1 and 68-2 provided in the first region 68b of the protective layer 68 on the magnetic recording element protrusion 80b, each indicated by a dotted line, in this case, a thickness T2 of the protective layer can be about 0.0 to 1.0 nm.

In order for the protective layer 68 remaining after being molded to have an optimized film thickness while exhibiting desired protection performance, the protective layer can be formed to have a large thickness T1 in advance before being processed. As long as the protective layer has a desired thickness (a minimum thickness ensuring protection) in the regions of the magnetic recording and reading element units 54 and 58, even though the protective layer 68 is thick in the other regions, neither magnetic recording and reading performance nor long-term reliability deteriorates. Rather, the forming of the protective layer 68 thick is advantageous in that coverage is improved, surface energy is reduced, thereby suppressing adhesion of contamination, which is one of factors of a change in flying height of the magnetic head 10.

Figure 19:
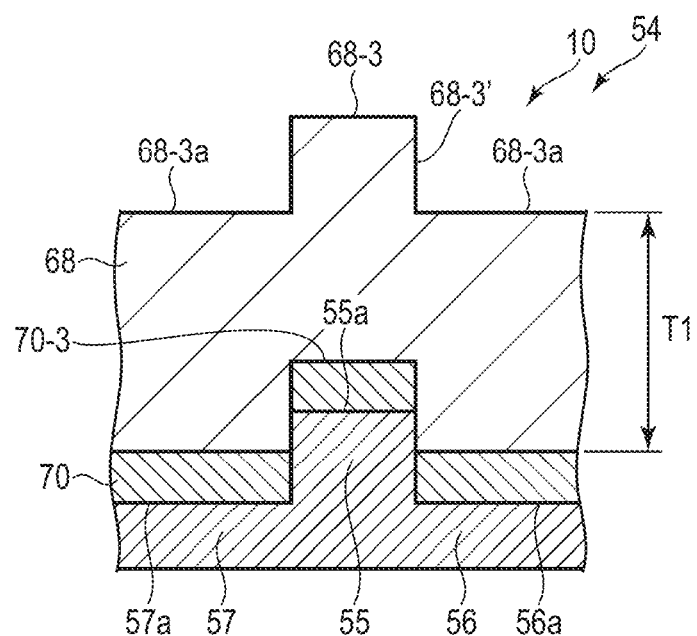
FIG. 19 is a view schematically illustrating a periphery of a reading and recording element unit of the magnetic head before processed.

FIG. 19 is a view schematically illustrating a periphery of the magnetic reading element unit of the magnetic head before processed.

As illustrated, in the magnetic reading element unit 54 of the magnetic head 10 before processed, the tip of the magnetic reading element 55 protrudes toward the medium beyond the tips 56a and 57a of the surrounding magnetic reading element shields 56 and 57 to form a magnetic reading element protrusion 55a. A protective layer 68 can be provided on the magnetic reading element protrusion 55a and the magnetic reading element shields 56(56a) and 57(57a), which are provided around the magnetic reading element protrusion 55a, via an adhesion layer 70, for example, in the same manner as in FIG. 7. The adhesion layer 70 is used to cause the protective layer 68 and the magnetic reading element unit 54 to adhere to each other. In addition, by covering the magnetic reading element unit 54 with two layers including the adhesion layer 70 and the protective layer 68, the magnetic reading element unit 54 is protected from corrosion and contact damage. The protective layer 68 includes a third region 68-3 on the magnetic reading element protrusion 55a and a fourth region 68-3a on the magnetic reading element shields 56 and 57. The third region 68-3 is formed in accordance with a contour shape of the magnetic reading element protrusion 55a, and the third region 68-3 protrudes beyond the fourth region 68-3a in the protective layer 68 before processed. The thicker the protective layer 68, the more reliably the magnetic recording and reading element units 58 and 54 can be protected. On the other hand, if the film thickness of the protective layer 68 is too thick, the gap between the magnetic recording and reading element units 58 and 54 and the magnetic disk 1 widens. This may cause deterioration in recording and reading ability, resulting in deterioration in recording density. In addition, when the protruding third region 68-3 is brought into contact with the magnetic recording medium 1 in the touch-down process, the magnetic reading element unit 54 may be damaged.

Therefore, in the magnetic head according to the embodiment, the protective layer 68 is processed so that the third region 68-3 and the fourth region 68-3a are flush with each other, or the third region 68-3 is recessed more than the fourth regions 68-3a.

Figure 20:
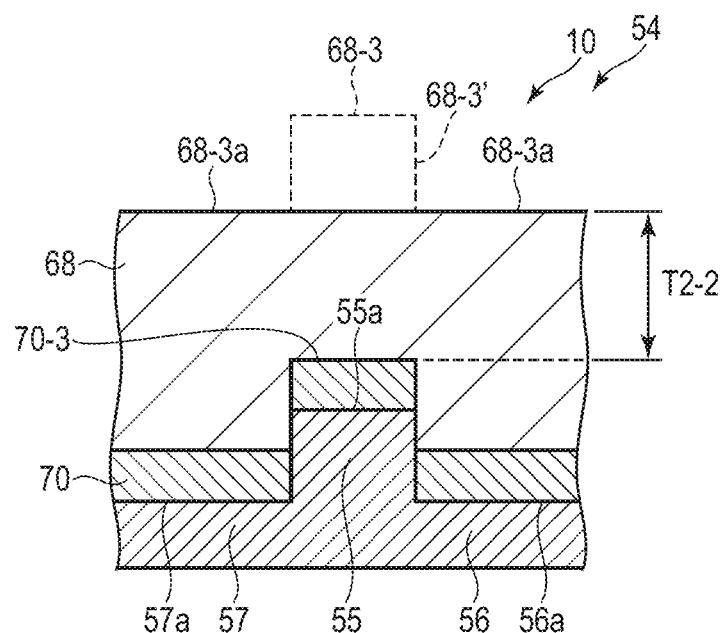
FIG. 20 is a view schematically illustrating a periphery of a reading and recording element unit of the magnetic head after processed.

FIG. 20 is a view schematically illustrating a periphery of the magnetic reading element unit of the magnetic head after processed according to the embodiment.

A configuration of the magnetic head illustrated in FIG. 20 is similar to that in FIG. 19, except that the protective layer 68 is processed such that the third region 68-3 and the fourth region 68-3a can be formed to be flush with each other by removing the protrusion indicated by a dotted line in the third region 68-3 of the protective layer 68 on the magnetic reading element protrusion 55a, in this case, a thickness T2-2 of the protective layer can be about 0.0 to 1.0 nm.

In order for the protective layer 68 remaining after being molded to have an optimized film thickness while exhibiting desired protection performance, the protective layer can be formed to have a large thickness T1 in advance before being processed. As long as the protective layer has a desired thickness (a minimum thickness ensuring protection) in the regions of the magnetic recording and reading element units 54 and 58, even though the protective layer 68 is thick in the other regions, neither magnetic recording and reading performance nor long-term reliability deteriorates. Rather, the forming of the protective layer 68 thick is advantageous in that coverage is improved, surface energy is reduced, thereby suppressing adhesion of contamination, which is one of factors of a change in flying height of the magnetic head 10.

If the magnetic head according to the embodiment is used, damage to the magnetic head caused when brought into contact with the magnetic recording medium can be reduced by adjusting the thickness of the protective layer of the magnetic head. By reducing an influence of the damage caused by the contact between the magnetic recording and reading element protrusions and the magnetic recording medium in the touch-down process or during the overall operation on the performance and reliability of the device, the performance and reliability of the device can be secured.

Second Embodiment

Figure 9:
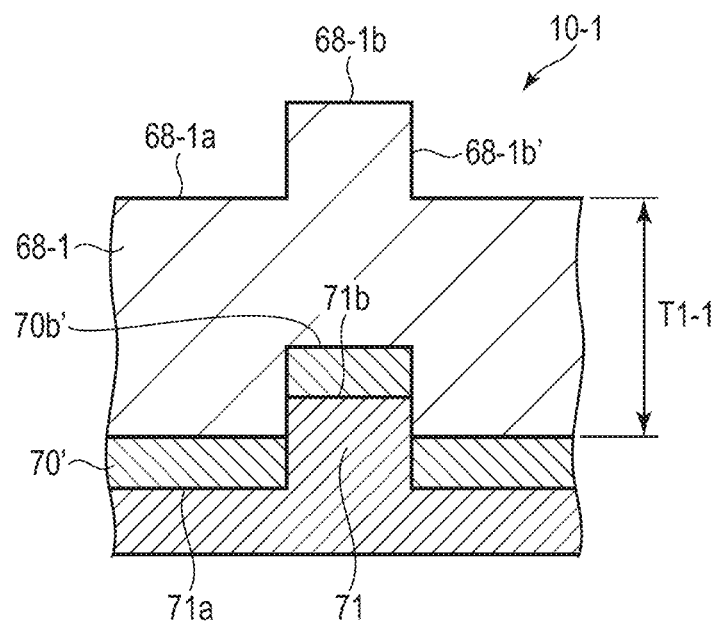
FIG. 9 is an enlarged schematic view of a periphery of a magnetic recording element unit in a modification of the magnetic head before processed.

FIG. 9 is an enlarged schematic view of a periphery of a magnetic recording element unit in a modification of the magnetic head before processed.

The magnetic head 10-1 is a magnetic head adopting a heat-assisted recording scheme. As illustrated, in the heat-assisted recording scheme, a laser is applied, such that a magnetic recording and reading element unit 71 including a magnetic recording element unit, a magnetic recording reading unit, and a near field transducer (NFT) has a protrusion 71*b* protruding beyond a magnetic recording and reading element shield 71*a* provided therearound. A protective layer 68-1 such as carbon is provided on the magnetic recording and reading element shield 71*a* and the protrusion 71*b* via an adhesion layer 70' such as silicon. A thickness of the adhesion layer can be about 0.3 to 1.0 nm. A thickness T1-1 of the protective layer can be about 1.0 to 3.0 nm. By covering the magnetic recording and reading element unit 71 with two layers including the adhesion layer 70' and the protective layer 68-1, the magnetic recording and reading element unit 71 is protected from corrosion and contact damage. The protective layer 68-1 includes a first region 68-1*b* on the protrusion 71*b* of the magnetic recording and reading element unit 71 and a second region 68-1*a* on the magnetic recording and reading element shield 71*a*. A protrusion 68-1*b* of the protective layer 68-1 is provided in the first region 68-1*b*, in accordance with a contour shape of the magnetic recording and reading element unit 71, via the adhesion layer 71*b'*, and the first region 68-1*b* protrudes beyond the second region 68-1*a* in the protective layer 68-1 before processed. The thicker the protective layer 68-1, the more reliably the magnetic recording and reading element unit 71 can be protected. On the other hand, if the film thickness of the protective layer 68-1 is too thick, the gap between the magnetic recording and reading element unit 71 and the magnetic disk 1 widens. This may cause deterioration in recording and reading ability, resulting in deterioration in recording density. In addition, when the protruding first region 68-1*b* is brought into contact with the magnetic recording medium 1 in the touch-down process, the magnetic recording and reading element unit 71 may be damaged. Since the NFT of the magnetic recording and reading element unit 71 is an important element in determining recording performance in the heat-assisted recording scheme, it is desirable to avoid contact damage or the like if possible in order to maintain performance and reliability.

Figure 10:
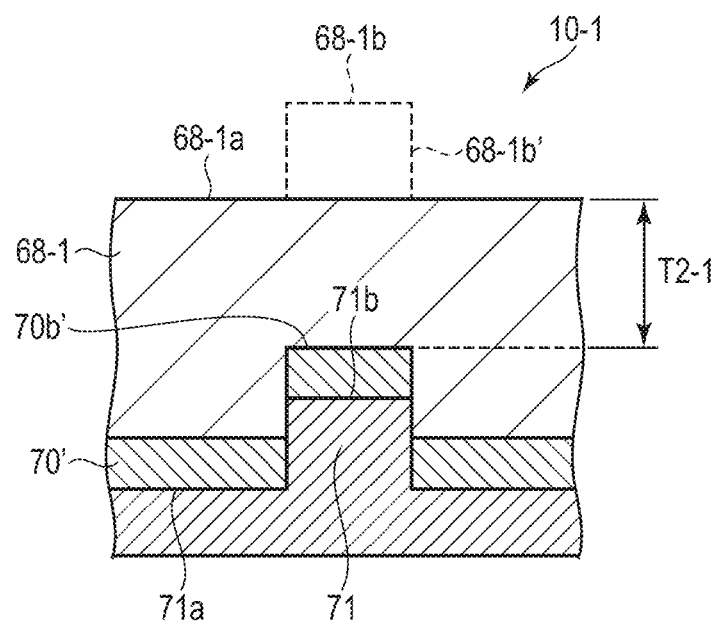
FIG. 10 is an enlarged view illustrating a periphery of a magnetic recording element unit in a modification of the magnetic head after processed according to the embodiment.

FIG. 10 is an enlarged view illustrating a periphery of a magnetic recording element unit in a modification of the magnetic head after processed according to the embodiment.

As illustrated, a configuration of the magnetic head 10-2 after processed is similar to that in FIG. 9, except that a protrusion 68-1*b'* in the first region 68-1*b* of the protective layer 68-1, which has previously been formed to slightly protrude by applying a laser, is processed, for example, to be removed such that the first region 68-1*b* is flush with the second region 68-1*a* on the shield 71*a*, and the magnetic recording and reading element unit is set such that the protrusion is flush with the shield at the time of applying the laser, in this case, a thickness T2-1 of the protective layer 68-1 can be about 0.0 to 2.0 nm.

If the modification of the magnetic head according to the embodiment is used, damage to the magnetic head caused when brought into contact with the magnetic recording medium can be reduced by adjusting the thickness of the protective layer of the magnetic head of the magnetic recording and reading device. In addition, by reducing an influence of the damage caused by the contact between the magnetic recording and reading element protrusion and the magnetic recording medium in the touch-down process or during the overall operation on the performance and reliability of the device, the performance and reliability of the device can be secured.

Third Embodiment

Figure 11:
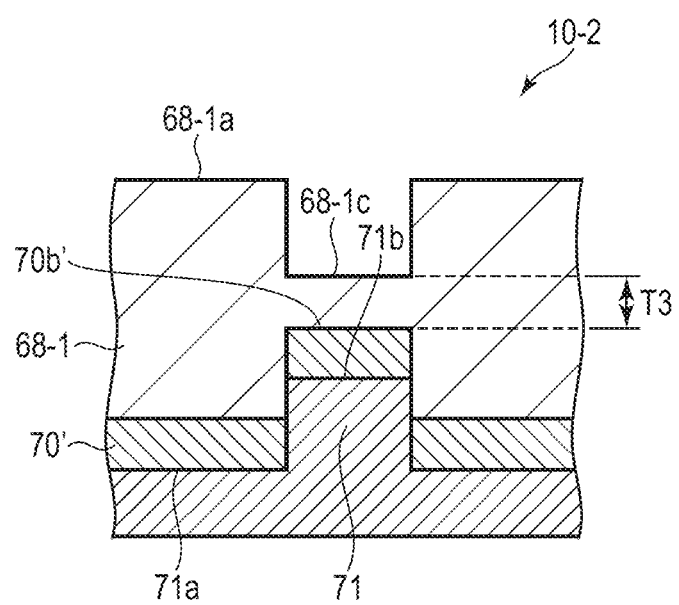
FIG. 11 is an enlarged view illustrating a periphery of a magnetic recording element unit in another modification of the magnetic head after processed according to the embodiment.

FIG. 11 is an enlarged view illustrating a periphery of a magnetic recording element unit in another modification of the magnetic head after processed according to the embodiment.

As illustrated, a configuration of the magnetic head 10-2 after processed according to another modification is similar to that in FIG. 9, except that a first region 68-1*c* of the protective layer 68-1, which has previously been formed to protrude more than that in the second embodiment using laser power stronger than that in the second embodiment when applying a laser, is processed to be removed such that an amount of removal is larger than that in the second embodiment, and the first region 68-1*c* of the protective layer 68-1 is recessed more than the second region 68-1*a* on the shield 71*a*, in this case, a thickness T3 of the protective layer can be about 0.0 to 1.0 nm. As described above, if the modification of the magnetic head according to the embodiment is used, by adjusting a thickness of the protective layer of the magnetic head of the magnetic recording and reading device, it is possible to reduce an influence of damage caused by the contact between the magnetic recording and reading element protrusion and the magnetic recording medium in the touch-down process or during the overall operation on the performance and reliability of the device, such that the performance and reliability of the device can be secured.

In the first to third embodiments, the first region or the third region of the protective layer used in the magnetic head can be scraped when the magnetic head is produced, or can be scraped in the process of inspecting the magnetic head or the recording medium.

Fourth Embodiment

A method for manufacturing the magnetic head according to the third embodiment includes an example of timing at which the protective layer used in the magnetic head is scraped, and includes subjecting the magnetic head to touch-down on the surface of the magnetic recording medium having a scraping portion thereon such that the protective layer at least on the magnetic recording element protrusion or the magnetic reading element protrusion of the magnetic head is scraped by the scraping portion.

In addition, a method for manufacturing a magnetic recording and reading device according to a fourth embodiment includes, after assembling the magnetic recording and reading device including a magnetic recording medium having a scraping portion thereon and a magnetic head, subjecting the magnetic head to touch-down on a surface of the magnetic recording medium such that a protective layer at least on a magnetic recording element protrusion or a magnetic reading element protrusion of the magnetic head is scraped by the scraping portion.

By using this method, it is possible to scrape a first region or a third region of the protective layer used in the magnetic head simultaneously in the touch-down process without increasing the number of processes. The touch-down process can be performed, for example, as one of inspection processes in the method for manufacturing the magnetic head or the recording and reading device.

Figure 12:
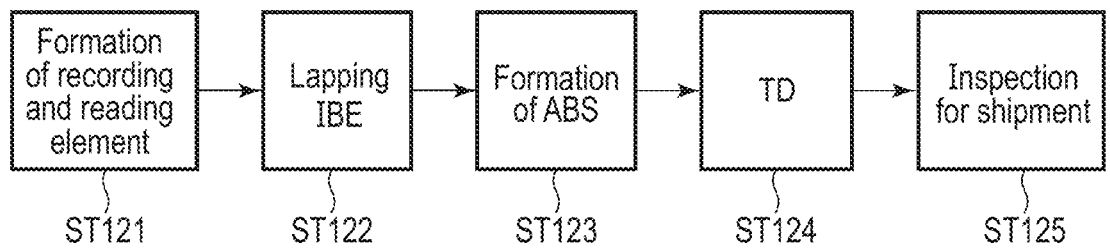
FIG. 12 is a flowchart illustrating a method for manufacturing a magnetic head according to a third embodiment.

FIG. 12 is a flowchart illustrating a method for manufacturing the magnetic head according to the third embodiment.

As illustrated, first, a recording and reading element is formed in a head unit of a slider (ST121). Next, lapping is performed on the recording and reading element unit using ion beam etching (IBE) to form a shape thereof and finely process a surface thereof (ST122). Thereafter, a protrusion and a recess are formed on an air bearing surface (ST123). Subsequently, a touch-down process is performed (ST124), and simultaneously, a protrusion of a protective layer is scraped. Thereafter, an inspection for shipment is performed (ST125).

Figure 13:
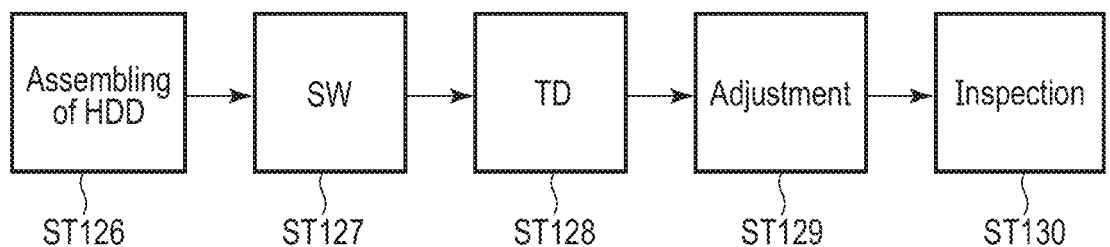
FIG. 13 is a flowchart illustrating a method for manufacturing a magnetic recording and reading device according to a fourth embodiment.

In addition, FIG. 13 is a flowchart illustrating a method for manufacturing the magnetic recording and reading device according to the fourth embodiment.

Here, the touch-down process is performed as a part of an inspection process in the method for manufacturing the magnetic recording and reading device.

As illustrated, first, a magnetic recording and reading device is assembled in a housing (ST126). Thereafter, a servo write (SW) process is performed to write positioning information in a servo region of a magnetic recording medium (ST127). Subsequently, a touch-down process is performed at a desired position (ST128), and simultaneously, a protrusion of a protective layer is scraped. Next, an optimum flying height, a current applied to a recording element, etc., are adjusted based on a result of the touch-down process (ST129). Last, the magnetic recording and reading device is inspected for recording and reading performance etc., (ST130).

As illustrated in FIGS. 12 and 13, the timing at which the protrusion of the protective layer is scraped in the touch-down process can be roughly divided into two types, that is, before an inspection for shipment after manufacturing the magnetic head and before an inspection for shipment after manufacturing the magnetic recording and reading device. In either the touch-down process (ST124) or the touch-down process (ST128), the magnetic head is actually flown above the magnetic disk, and the touch-down process is repeated or the touch-down state is continued for a certain period of time, so that the protrusion of the protective layer can be scraped due to abrasion by contact with the magnetic disk. In this case, a scraping amount and time can be controlled by adjusting DFH power for the touch-down process to stably scrape the protrusion in a shorter period of time.

There is no great difference between the touch-down process (ST124) and the touch-down process (ST128) for the magnetic head manufacturing process and the HDD manufacturing process, respectively, and the touch-down process is performed in the following order. First, DFH power is applied, and at the same time, a value of a contact detection sensor disposed in the vicinity of or inside the magnetic head is monitored. In the magnetic head manufacturing process, a contact can be detected by arranging an acoustic emission (AE) sensor in the suspension mechanism supporting the magnetic head. In the magnetic recording and reading device manufacturing process, a contact can be detected using a head disk interface (HDI) sensor as a temperature sensor built in the magnetic head. For example, when DFH power is applied and the protrusion in the vicinity of the magnetic reading element or the magnetic recording element of the magnetic head comes into contact with the magnetic disk, vibration is detected and heat is detected at that time, resulting in increases in output value of the AE sensor and the HDI sensor. A threshold is provided in advance for the output value, and when an output of each sensor exceeds the threshold, it is determined that a touch-down process is being performed. During the touch-down process, since the magnetic recording and reading element unit is in contact with the magnetic disk, the protrusion can be scraped.

Fifth Embodiment

Figure 14:
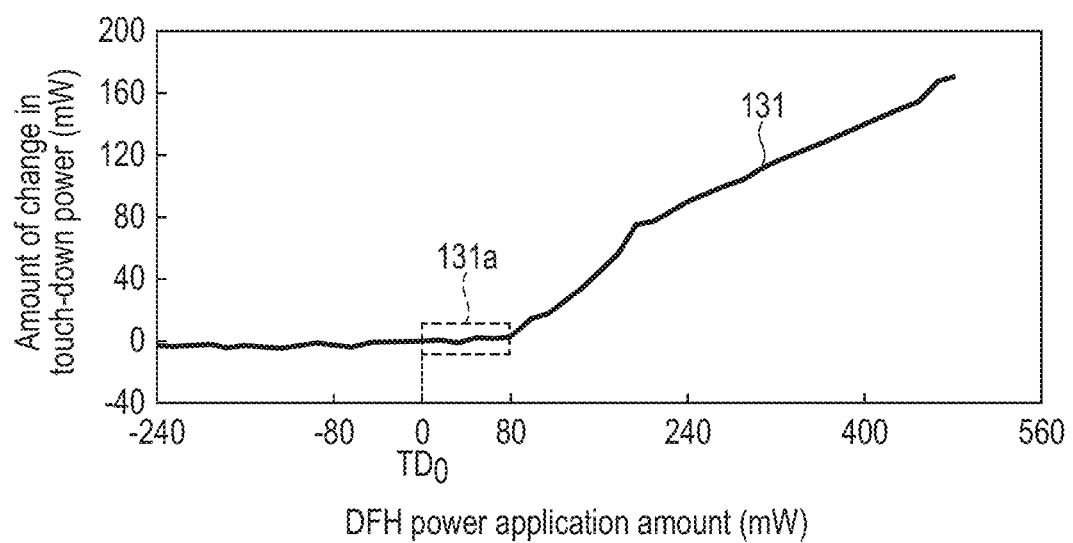
FIG. 14 is a graph illustrating a relationship between an amount of DFH power applied to the magnetic head and an amount of change in touch-down power.

FIG. 14 is a graph illustrating a relationship between an amount of DFH power applied to the magnetic head and an amount of change in touch-down power.

In a horizontal axis of FIG. 14, "0" as the DFH power application amount indicates a time at which the shield comes into contact with the surface of the magnetic disk (near a surface of a lubricant applied to the surface of the magnetic disk), thereby determining touch-down. A value smaller than 0 (left side from 0) indicates a state in which a gap between the magnetic head and the disk increases by reducing the DFH power application amount. In addition, a value larger than 0 (right side from 0) indicates a state in which a gap between the magnetic disk and the magnetic head decreases by increasing the DFH power application amount. Note that, here, a DFH power application amount when touch-down is first determined is denoted by TD0.

Next, DFH power larger than TD0 by a certain amount is applied. Accordingly, the magnetic head and the magnetic medium come into stronger contact with each other than that at the time of the first touch-down. Thereafter, the DFH power application amount is returned to a desired value, and the magnetic head becomes sufficiently separated from the magnetic disk. Next, DFH power larger than that at the previous cycle by a certain amount is applied to bring the magnetic head and the magnetic medium into contact with each other, and then the magnetic head and the magnetic medium are returned. When this operation is repeated and the DFH power application amount gradually increases, the protective layer on the shield is scraped, causing an increase in gap between the magnetic head and the magnetic disk. Therefore, the repeated application of the DFH power causes a gradual increase in DFH power application amount when touchdown is determined based on the contact of the protective layer on the shield with the magnetic disk. A graph 131 in FIG. 14 is obtained by plotting differences of these touch-down power application amounts from the initial touch-down power application amount TD0 in a vertical axis.

In the graph 131, there is a region 131a having no change in touch-down power from TD0 to about 80 mW. Since TD0 denotes power when the protective layer on the shield comes into contact with the surface of the lubricant of the magnetic disk, a gap between the protective layer on the protrusion of the magnetic recording and reading element and the protective layer formed under the lubricant of the magnetic disk is smaller than a gap between the surface of the lubricant and the protective layer of the magnetic disk. When the DFH power application amount further increases from that state, the protective layer on the protrusion of the magnetic recording and reading element comes into contact with the surface of the magnetic disk and starts to be abraded earlier than the protective layer on the shield. When the DFH power application amount further increases, the protective layer on the protrusion of the magnetic recording and reading element (the protrusion of the protective layer) is sufficiently scraped, and the protective layer on the shield comes into contact with the magnetic disk. This state occurs when DFH power application amount is 80 mW in the graph 131 of FIG. 14. Thereafter, when the DFH power application amount increases, the protective layer on the shield is scraped based on contact, and thus, the touch-down power increases depending on a scraped amount, that is, the DFH power application amount. This is the reason why, in the graph 131 of FIG. 14, the amount of change in touch-down power increases in the right direction when the DFH power application amount exceeds 80 mW.

Given this, what corresponds to a horizontal-axis amount (DFH power application amount) of the region 131a is a size of the scraped protrusion of the protective layer of the magnetic recording and reading element. Although different depending on an elemental structure of the magnetic head and a surface state of the magnetic disk, 80 mW corresponds to, for example, about 0.3 nm. In this case, a protruding amount of the protective layer of the magnetic recording and reading element may be about 0.3 nm.

Note that, in order to actually scrape the protrusion of the protective layer of the magnetic recording and reading element, a DFH power application amount in which the region 131a disappears may be checked in advance, and the checked DFH power application amount may be used as a set value for a protrusion scraping amount of the protective layer in the touch-down process at the time of manufacturing the magnetic head as illustrated in FIG. 12 or in the touch-down process at the time of manufacturing the HDD as illustrated in FIG. 13. In this way, it is possible to manufacture a magnetic head in a stable state in which a magnetic recording and reading element does not protrude from a shield surface or a hard disk drive on which the same is mounted.

Sixth Embodiment

The magnetic recording medium used in each of the second embodiment and the fourth embodiment can be provided with a scraping portion capable of scraping at least a first region or a third region of the protective layer when brought into contact therewith in the touch-down process.

The scraping portion may include one or more protrusions provided on the surface of the magnetic recording medium. Alternatively, the scraping portion may be provided on the surface of the magnetic recording medium, and a scraping region of the magnetic recording medium may have a larger surface roughness than a surface roughness of a non-scraping region of the magnetic recording medium.

Figure 15:
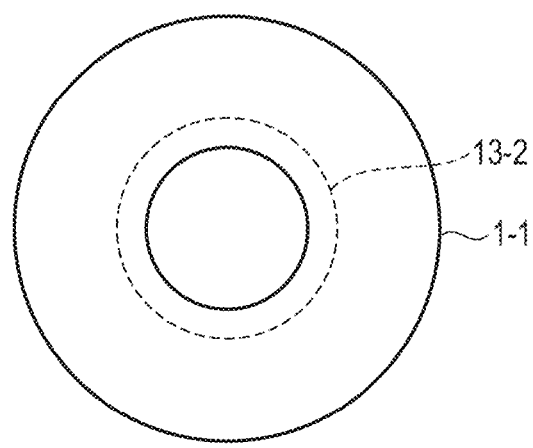
FIG. 15 is a schematic view illustrating an example of a magnetic recording medium used in the embodiment.

FIG. 15 is a schematic view illustrating an example of a magnetic recording medium used in an embodiment.

The disk-shaped magnetic recording medium 1-1 has a scraping portion 13-2 at a specific location, for example, on an inner peripheral side of a track. The scraping portion 13-2 can have a shape of protrusions and recesses for easily scraping the protrusion of the protective layer when brought into contact therewith.

Figure 16:
FIG. 16 is a schematic view illustrating an example of a shape of a scraping portion.

FIG. 16 is a schematic view illustrating an example of a shape of the scraping portion.

A scraping portion 134 has a larger surface roughness than a surface roughness of a data surface 134a.

Figure 17:
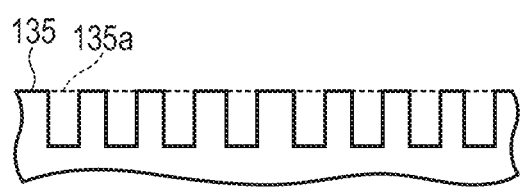
FIG. 17 is a schematic view illustrating another example of a shape of the scraping portion.

FIG. 17 is a schematic view illustrating another example of a shape of the scraping portion.

A scraping portion 135 can be a zone of a disk surface 135a formed to have a shape of protrusions and recesses, and can be provided, for example, in the innermost peripheral area on the disk surface.

Figure 18:
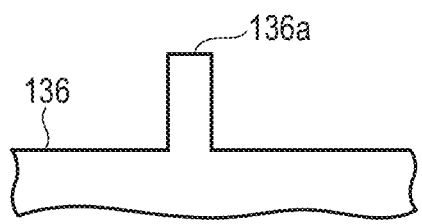
FIG. 18 is a schematic view illustrating another example of a shape of the scraping portion.

FIG. 18 is a schematic view illustrating another example of a shape of the scraping portion.

A scraping portion 136 has a protrusion 136a capable of easily scraping the recording and reading element protrusion when brought into collision therewith.

The scraping portions 134 to 136 illustrated in FIGS. 16 to 18, respectively, can be provided at the same position as the scraping portion 13-2 or in the innermost peripheral area on the disk surface.

The magnetic recording medium having the scraping portion can be used to scrape the protrusion of the protective layer in the touch-down process. As occasion demands, the magnetic recording medium can be removed after being used in the process of scraping the protrusion, or can be left in the magnetic recording and reading device and used in that state. When the magnetic recording medium is provided in the magnetic recording and reading device, even if the touch-down process for scraping the protrusion of the protective layer is not performed at the time of manufacturing the magnetic head or at the time of manufacturing the HDD, the touch-down process can be performed to scrape the protrusion of the protective layer during the use of the magnetic recording and reading device, making it possible to further simplify the process at the time of manufacturing the magnetic head or at the time of manufacturing the HDD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head to be flown above a magnetic recording medium to record or read magnetic information, the magnetic head comprising:
    at least one element unit of a magnetic recording element unit or a magnetic reading element unit on an air bearing surface-side facing the magnetic recording medium when the magnetic head is flown; and a protective layer that protects the element unit,
    wherein the magnetic recording element unit includes a magnetic recording element, a magnetic recording element protrusion protruding from the magnetic recording element, and a magnetic recording element shield surrounding the magnetic recording element protrusion, the magnetic reading element unit includes a magnetic reading element, a magnetic reading element protrusion protruding from the magnetic reading element, and a magnetic reading element shield surrounding the magnetic reading element protrusion, the protective layer includes a first region on the magnetic recording element protrusion and a second region on the magnetic recording element shield when the element unit is the magnetic recording element unit, or includes a third region on the magnetic reading element protrusion and a fourth region on the magnetic reading element shield when the element unit is the magnetic reading element unit, the first region and the second region are flush with each other, or the first region is recessed more than the second region, and the third region and the fourth region are flush with each other, or the third region is recessed more than the fourth region.

2. The magnetic head according to claim 1, wherein the first region or the third region is scraped in inspecting the magnetic head.

3. A magnetic recording and reading device comprising the magnetic head according to claim 1.

4. The magnetic recording and reading device according to claim 3, wherein the first region or the third region is scraped in inspecting the magnetic recording medium.

5. The magnetic recording and reading device according to claim 3, further comprising a magnetic recording medium including a scraping portion that scrapes at least the first region or the third region of the protective layer when brought into contact therewith in a touch-down process.

6. The magnetic recording and reading device according to claim 5, wherein the scraping portion includes one or more protrusions provided on a surface of the magnetic recording medium.

7. The magnetic recording and reading device according to claim 5, wherein the scraping portion is provided on a surface of the magnetic recording medium, and a scraping region of the magnetic recording medium has a larger surface roughness than a surface roughness of a non-scraping region of the magnetic recording medium.

* * * * *